(12) United States Patent
Kitamura

(10) Patent No.: US 7,211,618 B2
(45) Date of Patent: May 1, 2007

(54) PAINT COMPOSITION FOR IN-MOLD COATING OF THERMOPLASTIC PLASTIC SUBSTRATES AND ITS USES

(75) Inventor: Akihiro Kitamura, Hirakata (JP)

(73) Assignee: Nippon Bee Chemical Co., Ltd., Osaka (JP)

( * ) Notice: Subject to any disclaimer, the term of this patent is extended or adjusted under 35 U.S.C. 154(b) by 122 days.

(21) Appl. No.: 10/990,159

(22) Filed: Nov. 15, 2004

(65) Prior Publication Data

US 2005/0131130 A1    Jun. 16, 2005

(30) Foreign Application Priority Data

Dec. 10, 2003   (JP)   ............................. 2003-411620

(51) Int. Cl.
*C08L 51/08* (2006.01)
(52) U.S. Cl. ..................................... 524/539
(58) Field of Classification Search ................. 524/539
See application file for complete search history.

(56) References Cited

FOREIGN PATENT DOCUMENTS

JP      2002-249680 A      9/2002
JP      249680      *  9/2002

\* cited by examiner

*Primary Examiner*—Robert D. Harlan

(57) ABSTRACT

An object of the present invention is to provide a paint composition for in-mold coating of thermoplastic plastic substrates, the paint film resultant from which composition neither peels off nor becomes turbid even if the mold is opened in a state where its temperature is high, needless to say that the resultant paint film has excellent adhesion to nonpolar thermoplastic plastic substrates and adequate flowability. As a means of achieving this object, a paint composition according to the present invention for in-mold coating of thermoplastic plastic substrates comprises: an acryl-modified unsaturated dicarboxylic acid (anhydride)-grafted polyolefin (A); at least one member (B) selected from the group consisting of reactive oligomers and reactive monomers; and a radical polymerization initiator (C); in a specific formulation ratio, with the paint composition being characterized in that: the acryl-modified unsaturated dicarboxylic acid (anhydride)-grafted polyolefin (A) is in the range of 92 to 112° C. in melting point and in the range of 5 to 15 mass % in ratio for which unsaturated dicarboxylic acid (anhydride)-derived structural units account in its structure.

2 Claims, No Drawings

PAINT COMPOSITION FOR IN-MOLD COATING OF THERMOPLASTIC PLASTIC SUBSTRATES AND ITS USES

BACKGROUND OF THE INVENTION

A. Technical Field

The present invention relates to: a paint composition for in-mold coating, which is suitable for in-mold coating to thermoplastic plastic substrates such as polyolefins; and a thermoplastic plastic molding which involves the use of this paint composition.

B. Background Art

Polyolefinic resins, which are typical as thermoplastic plastics, have various excellent properties such as moldability, chemical resistance, heat resistance, water resistance, and good electrical properties and are inexpensive, so they have hitherto widely been utilized as plastic moldings for such as home electric appliances and automobile parts. In addition, as the case may be, these plastic moldings are decorated by in-mold coating.

However, prior paint compositions for in-mold coating have had problems in that: if thermosetting resins or polar materials are used as substrates, then the prior paint compositions may be able to exercise sufficient adhesion, but, if nonpolar materials such as the polyolefinic resins are used as substrates, then the adhesion is so insufficient as to result in failure to obtain sufficient paint film performances. Furthermore, paint compositions used for in-mold coating are required to have not only the adhesion to substrates but also the flowability for injecting the composition into a narrow cavity in a mold. However, as to the prior paint compositions for in-mold coating, this flowability has also been insufficient.

Thus, as solution of these problems, there is proposed a paint composition for in-mold coating of thermoplastic plastic substrates, which comprises: an acryl-modified polyolefin; a reactive oligomer and/or a reactive monomer; and a radical polymerization initiator; in a specific ratio (refer to patent document 1 below).

[Patent Document 1] JP-A-249680/2002 (Kokai)

However, the paint composition for in-mold coating which is described in the aforementioned patent document 1 has had a problem in that: it may have satisfactory performances in points of the adhesion to nonpolar materials and the flowability, but, if the temperature of the mold during the molding operation is higher than the melting point of the above composition, then, in order to prevent the paint film from peeling off during the mold-releasing operation, the mold must be cooled and then opened. As a means of solving this problem, it can be conceived to raise the melting point of the composition. However, as to the paint composition for in-mold coating which is described in the aforementioned patent document 1, another problem that the resultant paint film becomes turbid has been found to occur, from the present inventor's attempt to use an acryl-modified polyolefin of a high melting point in order to raise the melting point of the composition.

SUMMARY OF THE INVENTION

A. Object of the Invention

Thus, an object of the present invention is to provide: a paint composition for in-mold coating of thermoplastic plastic substrates, the paint film resultant from which composition neither peels off nor becomes turbid even if the mold is opened in a state where its temperature is high, needless to say that the resultant paint film has excellent adhesion to nonpolar thermoplastic plastic substrates and adequate flowability; and a thermoplastic plastic molding which involves the use of this paint composition.

B. Disclosure of the Invention

The present inventor diligently studied to solve the above problems. As a result, the present inventor has completed the present invention by finding out that the aforementioned problems can be solved at a stroke by: using an acryl-modified unsaturated dicarboxylic acid (anhydride)-grafted polyolefin which is in specific ranges in melting point and ratio for which unsaturated dicarboxylic acid (anhydride)-derived structural units account in its structure; and mixing this polyolefin with at least one member selected from the group consisting of reactive oligomers and reactive monomers and with a radical polymerization initiator in a specific ratio.

That is to say, a paint composition according to the present invention for in-mold coating of thermoplastic plastic substrates is a paint composition comprising: an acryl-modified unsaturated dicarboxylic acid (anhydride)-grafted polyolefin (A); at least one member (B) selected from the group consisting of reactive oligomers and reactive monomers; and a radical polymerization initiator (C); in the following formulation ratio:

$(A)/(B)=6.5/93.5$ to $60/40$ (mass ratio)

$(C)/[(A)+(B)]=0.1/100$ to $10/100$ (mass ratio)

with the paint composition being characterized in that: the acryl-modified unsaturated dicarboxylic acid (anhydride)-grafted polyolefin (A) is in the range of 92 to 112° C. in melting point and in the range of 5 to 15 mass % in ratio for which unsaturated dicarboxylic acid (anhydride)-derived structural units account in its structure.

A thermoplastic plastic molding according to the present invention is coated with the aforementioned paint composition according to the present invention for in-mold coating of thermoplastic plastic substrates.

Incidentally, the notation "unsaturated dicarboxylic acid (anhydride)" in the present invention is a meaning which includes an unsaturated dicarboxylic acid and an unsaturated dicarboxylic anhydride.

C. Effects of the Invention

The present invention can provide a paint composition for in-mold coating of thermoplastic plastic substrates, the paint film resultant from which composition neither peels off nor becomes turbid even if the mold is opened in a state where its temperature is high, needless to say that the resultant paint film has excellent adhesion to nonpolar thermoplastic plastic substrates (e.g. polyolefin substrates) and adequate flowability. In addition, the present invention can provide a thermoplastic plastic molding which is given excellent performances (e.g. durability, design properties) by in-mold coating with the above paint composition.

These and other objects and advantages of the present invention will be more fully apparent from the following detailed disclosure.

DETAILED DESCRIPTION OF THE INVENTION

Hereinafter, detailed descriptions are given about the paint composition according to the present invention for in-mold coating of thermoplastic plastic substrates (which may hereinafter be abbreviated as "paint composition according to the present invention") and about the thermoplastic plastic molding according to the present invention. However, the scope of the present invention is not bound to these descriptions. And other than the following illustrations can also be carried out in the form of appropriate modifications of the following illustrations within the scope not departing from the spirit of the present invention.

[Paint Composition for In-Mold Coating of Thermoplastic Plastic Substrates]:

The paint composition according to the present invention is a paint composition comprising: an acryl-modified unsaturated dicarboxylic acid (anhydride)-grafted polyolefin (A); at least one member (B) selected from the group consisting of reactive oligomers and reactive monomers; and a radical polymerization initiator (C). Because of containing the acryl-modified unsaturated dicarboxylic acid (anhydride)-grafted polyolefin (A) along with the radical polymerization initiator (C), the paint composition according to the present invention can exercise excellent adhesion also to nonpolar thermoplastic plastic substrates (e.g. polyolefin substrates). In addition, because of containing the at least one member (B) selected from the group consisting of reactive oligomers and reactive monomers, the paint composition according to the present invention can be given adequate flowability.

The aforementioned acryl-modified unsaturated dicarboxylic acid (anhydride)-grafted polyolefin (A) (which may hereinafter be referred to as "component A") comprises polyolefin-derived structural units, unsaturated dicarboxylic acid (anhydride)-derived structural units, and acryl-derived structural units, and can be obtained from a polyolefin component, an unsaturated dicarboxylic acid (anhydride) component, and an acryl component. Incidentally, as to each of these components (the polyolefin component, the unsaturated dicarboxylic acid (anhydride) component, and the acryl component) as described below, only one kind may be used, or at least two kinds may jointly be used.

Favorable examples of the polyolefin component, which constitutes the aforementioned component A, include copolymers comprising at least one α-olefin having 4 to 12 carbon atoms and propylene as essential constitutional units. Hereupon, examples of the α-olefin having 4 to 12 carbon atoms include 1-butene, 1-pentene, 1-hexene, 1-octene, 1-decene, and 4-methyl-1-pentene. Above all, 1-butene, 1-pentene, 1-decene, and 4-methyl-1-pentene are favorable, and 1-butene is the most favorable. The ratio for which these α-olefins having 4 to 12 carbon atoms account in the aforementioned polyolefin component is favorably in the range of 15 to 70 mol %. Incidentally, the most favorable as the polyolefin component is a copolymer comprising only the aforementioned α-olefin having 4 to 12 carbon atoms and propylene as constitutional units. However, also favorably used as the polyolefin component is a copolymer comprising not only the aforementioned α-olefin having 4 to 12 carbon atoms and propylene but also an olefin (e.g. ethylene) other than them as a constitutional unit. However, as to this copolymer comprising also the olefin other than the aforementioned α-olefin having 4 to 12 carbon atoms and propylene as a constitutional unit, for example, if this copolymer comprises also ethylene as a constitutional unit (e.g. in the case of such as a copolymer of propylene/1-butene/ethylene), then the ratio for which ethylene accounts in the aforementioned polyolefin component is favorably not more than 1 mol %, more favorably not more than 0.5 mol %, still more favorably not more than 0.1 mol %.

The polyolefin component, which constitutes the aforementioned component A, is favorably a thermally degraded polyolefin from a high-molecular polyolefin, namely, a low-molecular polyolefin obtained by pyrolyzing the high-molecular polyolefin at high temperature. The thermally degraded polyolefin from the high-molecular polyolefin is such that, at its terminals and in its molecule, there uniformly exist comparatively many double bonds, and is therefore so easy to graft with the unsaturated dicarboxylic acid (anhydride) that the below-mentioned unsaturated dicarboxylic acid (anhydride) addition ratio, which is generally considered difficult to raise, can be enhanced up to the below-mentioned comparatively high range. As a process for obtaining the thermally degraded polyolefin, for example, it will do if a high-molecular polyolefin having a number-average molecular weight of 15,000 to 150,000 is heated in the range of 180 to 300° C. in the presence of an organic peroxide, or in the range of 300 to 450° C. in the absence from the organic peroxide, for 0.5 to 1 hour. Favorable is a process in which the heating is carried out in the absence from the organic peroxide.

The number-average molecular weight of the polyolefin component, which constitutes the aforementioned component A, is favorably in the range of 500 to 40,000, more favorably 1,500 to 30,000.

Examples of the unsaturated dicarboxylic acid (anhydride) component, which constitutes the aforementioned component A, include: unsaturated dicarboxylic acids (e.g. maleic acid, fumaric acid, itaconic acid, citraconic acid, mesaconic acid, cyclohexenedicarboxylic acid, cycloheptenedicarboxylic acid, aconitic acid); unsaturated dicarboxylic anhydrides (e.g. maleic anhydride, citraconic anhydride, itaconic anhydride); and products by esterification between the aforementioned unsaturated dicarboxylic anhydrides and alkyl alcohols having 1 to 5 carbon atoms.

Examples of the acryl component, which constitutes the aforementioned component A, include: acryl components having active hydrogen, such as hydroxyl-group-containing (meth)acrylates (e.g. 4-hydroxybutyl (meth)acrylate); and isocyanate-group-containing acryl components (e.g. 2-acryloylethyl isocyan ate). Furthermore, such as (meth)acrylate esters (e.g. methyl (meth)acrylate) are also usable as the acryl component.

The process for obtaining the component A from the aforementioned polyolefin component, the aforementioned unsaturated dicarboxylic acid (anhydride) component, and the aforementioned acryl component is not especially limited. However, the component A can be obtained, for example, by such as a process in which: a graft addition reaction of the unsaturated dicarboxylic acid (anhydride) component to the polyolefin component is carried out, and then the acryl component is caused to react with the resultant product. Incidentally, such as specific reaction conditions in each process mentioned above will do if they are set appropriately in accordance with conventional processes for organic syntheses. If, for example, the (meth)acrylate ester is used as the acryl component when the acryl component is caused to react, then it will do to use, for example, organic peroxides having the hydrogen-abstracting ability, such as dicumyl peroxide.

It is important that the aforementioned component A is in the range of 92 to 112° C. in melting point. Because of this, excellent adhesion is exercised even at high temperature, so that the mold can immediately be opened in a state where its temperature is high without causing the peeling-off of the paint film and without cooling the mold. Favorably, the melting point of the component A is recommended to be in the range of 95 to 110° C. In the case where the melting point of the component A is lower than 92° C., the adhesion at high temperature is so insufficient that, if the mold is immediately opened in a state where its temperature is high without cooling the mold, then the peeling-off occurs to the paint film. On the other hand, in the case where the melting point of the component A is higher than 112° C., the resultant paint film tends to become turbid, and further its water resistance is deteriorated. Incidentally, the melting point of the component A will do if it is measured, for example, by differential scanning calorimetry (DSC).

It is important that the aforementioned component A is in the range of 5 to 15 mass % in ratio for which the unsaturated dicarboxylic acid (anhydride)-derived structural units account in its structure (i.e. unsaturated dicarboxylic acid (anhydride) addition ratio). Because of this, the compatibility of the component A with the reactive oligomer and reactive monomer (component B mentioned below) which are generally high in polarity is enhanced. As a result, the paint film without turbidity can be obtained. Favorably, the unsaturated dicarboxylic acid (anhydride) addition ratio in the component A is recommended to be in the range of 6 to 13 mass %. In the case where the unsaturated dicarboxylic acid (anhydride) addition ratio in the component A is less than 5 mass %, the resultant paint film becomes turbid, and further its water resistance is also deteriorated. On the other hand, in the case where the unsaturated dicarboxylic acid (anhydride) addition ratio in the component A is more than 15 mass %, the water resistance is deteriorated. Incidentally, the unsaturated dicarboxylic acid (anhydride) addition ratio in the component A will do if it is calculated, for example, from the ratio between peaks of carbonyl groups in infrared spectroscopy (IR).

Though not especially limited, the number-average molecular weight of the component A is, for example, favorably in the range of 600 to 50,100, more favorably 1,600 to 30,100. In the case where the number-average molecular weight of the component A is too small, the physical properties of the paint film tend to be inferior. On the other hand, in the case where the number-average molecular weight of the component A is too large, the resultant paint film becomes turbid as the case may be, and also there is a possibility that the flowability may be so inferior that the workability in the coating step is damaged.

Specific examples of the aforementioned at least one member (B) selected from the group consisting of reactive oligomers and reactive monomers (which may hereinafter be referred to as "component B") include urethane (meth) acrylates (oligomers), epoxy (meth)acrylates (oligomers), polyester (meth)acrylates (oligomers), polyether (meth) acrylates (oligomers), and (meth)acrylates (oligomers).

The aforementioned component B can be obtained by hitherto publicly known processes.

The weight-average molecular weight of the component B is favorably in the range of 100 to 50,000. In the case where the weight-average molecular weight of the component B is less than 100, the physical properties of the paint film tend to be inferior. On the other hand, in the case where the weight-average molecular weight of the component B is more than 50,000, the flowability tends to be inferior, so there is a possibility that the workability in the coating step may be damaged.

In the paint composition according to the present invention, it is important that the formulation ratio between the aforementioned components A and B is in the range of component A/component B=6.5/93.5 to 60/40 (mass ratio). Favorably, component A/component B=10/90 to 50/50 (mass ratio) is recommended. In the case where the ratio of the component A is less than the aforementioned ranges, in other words, in the case where the ratio of the component B is more than the aforementioned ranges, the adhesion to nonpolar substrates is inferior. On the other hand, in the case where the ratio of the component A is more than the aforementioned ranges, in other words, in the case where the ratio of the component B is less than the aforementioned ranges, the flowability is damaged, and also the resultant paint film becomes turbid.

Specific examples of the aforementioned radical polymerization initiator (C) (which may hereinafter be referred to as "component C") include t-amyl peroxy-2-ethylhexanoate and bis(4-t-butylcyclohexyl) peroxydicarbonate.

It is important that the formulation ratio of the aforementioned component C is in the range of component C/[component A+component B]=0.1/100 to 10/100 (mass ratio). Favorably, component C/[component A+component B]=0.5/100 to 5/100 (mass ratio) is recommended. In the case where the ratio of the component C is less than the aforementioned ranges, the polymerization is so insufficient that the adhesion cannot be exercised. On the other hand, in the case where the ratio of the component C is more than the aforementioned ranges, the reaction is too fast, and therefore the polymerization partly starts on the way of injecting the paint composition into the mold, so that adhesion dispersion according to parts occurs.

Incidentally, as to each of the aforementioned components A, B and C, only one kind may be used, or at least two kinds may jointly be used.

Favorably, the paint composition according to the present invention, if necessary, further contains a shining material within the range not damaging the effects of the present invention. Examples of the shining material include: metals or alloys (e.g. aluminum, copper, zinc, iron, nickel, tin, and aluminum oxide); mica powders; and graphite pigments. These shining materials may be either colored ones or non-colored ones.

Favorably, the paint composition according to the present invention, if necessary, further contains a colorant within the range not damaging the effects of the present invention. Such as publicly known pigments and dyes can be used as the colorant. Specific examples of the pigments include organic and inorganic color pigments, such as azo chelate pigments, insoluble azo pigments, condensed azo pigments, phthalocyanine pigments, indigo pigments, perynone pigments, perylene pigments, dioxane pigments, quinacridone pigments, isoindolinone pigments, metal-complex pigments, titanium oxide, chrome yellow, yellow iron oxide, red iron oxide, carbon black, and CINQUICIARED.

The paint composition according to the present invention may, if necessary, further contain, for example, hitherto publicly known additives (e.g. surface conditioners, leveling agents, pigment dispersants, solvents, ultraviolet absorbing agents, ultraviolet stabilizing agents, polymerization inhibitors, polymerization promoters, antioxidants, antistatic agents, flame retardants, fillers, mold-releasing agents, defoamers) within the range not damaging the effects of the present invention.

It is also possible to allow the paint composition according to the present invention to further contain, for example, urethane resins, polyester resins, melamine resins, and epoxy resins, if necessary. Though not especially limited, favorably, their formulation amount is recommended not to be larger than 20 mass % in the paint composition.

The paint composition according to the present invention can be used as a paint because the double bond or hydroxyl group (derived from the acryl component possessed by the aforementioned component A) and the aforementioned component B thermally copolymerize in the presence of the aforementioned component C and thereby cure.

[Thermoplastic Plastic Molding]:

The thermoplastic plastic molding according to the present invention is coated with the aforementioned paint composition according to the present invention.

The means for coating the paint composition according to the present invention is not especially limited. For example, it will do to adopt hitherto publicly known processes such as a process in which the paint composition is injected into the mold. In addition, the means for curing the paint composition according to the present invention is not especially limited, either. The curing will do if it is carried out by a process appropriately selected from among hitherto publicly known processes. Incidentally, the molding to be coated with the paint composition is not especially limited. For example, it will do if it is a molding obtained by shaping of thermoplastic plastics such as polyolefin resins, ABS resins, polycarbonate resins, urethane resins, polyester resins, polystyrene resins, vinyl chloride resins, and polyamide resins.

DETAILED DESCRIPTION OF THE PREFERRED EMBODIMENTS

Hereinafter, the present invention is more specifically illustrated by the following Examples of some preferred embodiments in comparison with Comparative Examples not according to the present invention. However, the present invention is not limited to them. Hereinafter, unless otherwise noted, the units "mass part(s)" and "mass %" are referred to simply as "part(s)" and "%" respectively.

Incidentally, the maleic anhydride addition ratios in the acryl-modified maleic anhydride-grafted polyolefins (A1) to (A10) having been obtained from Production Examples 1 to 10 (ratios for which the maleic anhydride-derived structural units accounted in the acryl-modified maleic anhydride-grafted polyolefins) were the same as those in the maleic anhydride-grafted polyolefins (aa1) to (aa10) respectively which were their precursors.

PRODUCTION EXAMPLE 1

A high-molecular polyolefin (copolymer of propylene and 1-butene: "TAFMER XR110T" produced by Mitsui Chemicals, INC.) was placed into a reactor as equipped with a stirrer and a thermometer. Then, this polyolefin was melted by heating it to 360° C. and then heated under a nitrogen gas flow for 80 minutes, thus obtaining a low-molecular polyolefin (a1) by thermal degradation. As results of analyses of this low-molecular polyolefin (a1), the number-average molecular weight was found to be 4,500 by gel permeation chromatography (hereinafter referred to as "GPC"), and the composition was found to comprise propylene 75 mol % and 1-butene 25 mol % by pyrolysis gas chromatography (hereinafter referred to as "pyrolysis gas chro.").

Next, 160 parts of the aforementioned low-molecular polyolefin (a1) was placed into a reactor as equipped with a stirrer, a thermometer and a condenser. Then, this polyolefin was melted by heating it to 180° C. under a nitrogen gas flow. Thereafter, 25 parts of maleic anhydride and 20 parts of 1-dodecene were added thereto to uniformly mix them together. Next, a solution (having beforehand been prepared by dissolving 1 part of dicumyl peroxide into 20 parts of xylene) was dropped thereto over a period of 2 hours while 180° C. was maintained. After this dropping, the stirring was further continued at 180° C. for 2 hours, thus carrying out a grafting reaction of the maleic anhydride. Thereafter, the xylene and the 1-dodecene were distilled off, thus obtaining a maleic anhydride-grafted polyolefin (aa1). As results of analyses of this maleic anhydride-grafted polyolefin (aa1), the number-average molecular weight was found to be 5,000 by GPC, and the melting point was found to be 100° C. by differential scanning calorimetry (hereinafter referred to as "DSC"), and the maleic anhydride addition ratio (ratio for which the maleic anhydride-derived structural units accounted in the maleic anhydride-grafted polyolefin (aa1)) (as calculated from the ratio between peaks of carbonyl groups in infrared spectroscopy (hereinafter referred to as "IR")) was found to be 10%.

Next, 450 parts of the aforementioned maleic anhydride-grafted polyolefin (aa1) was placed into a reactor as equipped with a stirrer, a thermometer and a condenser. Then, this polyolefin was heated to 105° C. under a nitrogen gas flow. Thereafter, while this temperature was maintained, 300 parts of toluene was gradually dropped thereto under stirring. Next, 135 parts of a hydroxyl-group-containing methacrylate ("Placcel FM-4" produced by Daicel Chemical Industries, Ltd.) was added thereto and then caused to react at the same temperature under stirring for 3 hours and then cooled, thus obtaining a solution of a hydroxyl-group-containing-methacrylate-modified maleic anhydride-grafted polyolefin (A1). The solid component having been obtained by removing the solvent from the resultant solution was analyzed by DSC. As a result, the melting point of the hydroxyl-group-containing-methacrylate-modified maleic anhydride-grafted polyolefin (A1) was 102° C. In addition, the solid component concentration of the resultant solution was 66.1%.

PRODUCTION EXAMPLE 2

A low-molecular polyolefin (a2) was obtained by thermal degradation in the same way as of Production Example 1 except that the high-molecular polyolefin as used in Production Example 1 was replaced with a high-molecular polyolefin (copolymer of propylene and 1-butene: "APAO UT2715" produced by UBE INDUSTRIES, LTD.). As results of analyses of this low-molecular polyolefin (a2), the number-average molecular weight was found to be 4,500 by GPC, and the composition was found to comprise propylene 80 mol % and 1-butene 20 mol % by pyrolysis gas chro.

Next, a maleic anhydride-grafted polyolefin (aa2) was obtained by carrying out grafting of maleic anhydride in the same way as of Production Example 1 except that the low-molecular polyolefin (a1) as used in Production Example 1 was replaced with the aforementioned low-molecular polyolefin (a2). As results of analyses of this maleic anhydride-grafted polyolefin (aa2), the number-average molecular weight was found to be 5,000 by GPC, and the melting point was found to be 105° C. by DSC, and the maleic anhydride addition ratio (ratio for which the maleic anhydride-derived structural units accounted in the maleic anhydride-grafted polyolefin (aa2)) (as calculated from the ratio between peaks of carbonyl groups in IR) was found to be 10%.

Next, a solution of a hydroxyl-group-containing-methacrylate-modified maleic anhydride-grafted polyolefin (A2)

was obtained by carrying out modification with the hydroxyl-group-containing methacrylate in the same way as of Production Example 1 except that the maleic anhydride-grafted polyolefin (aa1) as used in Production Example 1 was replaced with the aforementioned maleic anhydride-grafted polyolefin (aa2). The solid component having been obtained by removing the solvent from the resultant solution was analyzed by DSC. As a result, the melting point of the hydroxyl-group-containing-methacrylate-modified maleic anhydride-grafted polyolefin (A2) was 105° C. In addition, the solid component concentration of the resultant solution was 66.1%.

PRODUCTION EXAMPLE 3

A low-molecular polyolefin (a3) was obtained by thermal degradation in the same way as of Production Example 1 except that the high-molecular polyolefin as used in Production Example 1 was replaced with a high-molecular polyolefin (copolymer of propylene and 1-butene: "APAO UT2730" produced by UBE INDUSTRIES, LTD.). As results of analyses of this low-molecular polyolefin (a3), the number-average molecular weight was found to be 4,500 by GPC, and the composition was found to comprise propylene 80 mol % and 1-butene 20 mol % by pyrolysis gas chro.

Next, a maleic anhydride-grafted polyolefin (aa3) was obtained by carrying out grafting of maleic anhydride in the same way as of Production Example 1 except that the low-molecular polyolefin (a1) as used in Production Example 1 was replaced with the aforementioned low-molecular polyolefin (a3). As results of analyses of this maleic anhydride-grafted polyolefin (aa3), the number-average molecular weight was found to be 5,000 by GPC, and the melting point was found to be 110° C. by DSC, and the maleic anhydride addition ratio (ratio for which the maleic anhydride-derived structural units accounted in the maleic anhydride-grafted polyolefin (aa3)) (as calculated from the ratio between peaks of carbonyl groups in IR) was found to be 10%.

Next, a solution of a hydroxyl-group-containing-methacrylate-modified maleic anhydride-grafted polyolefin (A3) was obtained by carrying out modification with the hydroxyl-group-containing methacrylate in the same way as of Production Example 1 except that the maleic anhydride-grafted polyolefin (aa1) as used in Production Example 1 was replaced with the aforementioned maleic anhydride-grafted polyolefin (aa3). The solid component having been obtained by removing the solvent from the resultant solution was analyzed by DSC. As a result, the melting point of the hydroxyl-group-containing-methacrylate-modified maleic anhydride-grafted polyolefin (A3) was 110° C. In addition, the solid component concentration of the resultant solution was 66.1%.

PRODUCTION EXAMPLE 4

An amount of 150 parts of the maleic anhydride-grafted polyolefin (aa1) (having been obtained from Production Example 1) was placed into a reactor as equipped with a stirrer, a thermometer and a condenser. Then, this polyolefin was heated to 105° C. under a nitrogen gas flow. Thereafter, while this temperature was maintained, 600 parts of toluene was gradually dropped thereto under stirring. Next, 16 parts of 4-hydroxybutyl acrylate was gradually added thereto and then caused to react at the same temperature under stirring for 2 hours, thus obtaining a toluene solution of a 4-hydroxybutyl acrylate-modified maleic anhydride-grafted polyolefin (A'4).

Next, 300 parts of toluene was placed into a reactor as equipped with a stirrer, a thermometer and a condenser. Then, this toluene was heated to 105° C. under a nitrogen gas flow. Next, a mixture of 500 parts of the aforementioned toluene solution of the 4-hydroxybutyl acrylate-modified maleic anhydride-grafted polyolefin (A'4), 50 parts of methyl methacrylate, 23 parts of n-butyl acrylate, and 5 parts of t-butyl peroxy-2-ethylhexanoate was dropped thereto over a period of 3 hours. After this dropping, the stirring was further continued at 105° C. for 1 hour. Next, 10 parts of a 10% toluene solution of t-butyl peroxy-2-ethylhexanoate was dropped thereto over a period of 30 minutes. After this dropping, the stirring was further continued at 105° C. for 1 hour. Next, furthermore, 10 parts of the 10% toluene solution of t-butyl peroxy-2-ethylhexanoate was dropped thereto over a period of 30 minutes. After this dropping, the stirring was further continued at 105° C. for 1 hour. Thereafter, the reaction mixture was cooled, thus obtaining a solution of a maleic anhydride-grafted polyolefin (A4) as modified with 4-hydroxybutyl acrylate (HBA), methyl methacrylate (MMA), and n-butyl acrylate (BA). The solid component having been obtained by removing the solvent from the resultant solution was analyzed by DSC. As a result, the melting point of the HBA-MMA-BA-modified maleic anhydride-grafted polyolefin (A4) was 102° C. In addition, the solid component concentration of the resultant solution was 21.2%.

PRODUCTION EXAMPLE 5

A low-molecular polyolefin (a5) was obtained by thermal degradation in the same way as of Production Example 1 except that the high-molecular polyolefin as used in Production Example 1 was replaced with a high-molecular polyolefin (copolymer of propylene and ethylene: "Mitsui Polypro J218" produced by Mitsui Chemicals, INC.). As results of analyses of this low-molecular polyolefin (a5), the number-average molecular weight was found to be 4,500 by GPC, and the composition was found to comprise propylene 98 mol % and ethylene 2 mol % by pyrolysis gas chro.

Next, a maleic anhydride-grafted polyolefin (aa5) was obtained by carrying out grafting of maleic anhydride in the same way as of Production Example 1 except that the low-molecular polyolefin (a1) as used in Production Example 1 was replaced with the aforementioned low-molecular polyolefin (a5). As results of analyses of this maleic anhydride-grafted polyolefin (aa5), the number-average molecular weight was found to be 5,000 by GPC, and the melting point was found to be 150° C. by DSC, and the maleic anhydride addition ratio (ratio for which the maleic anhydride-derived structural units accounted in the maleic anhydride-grafted polyolefin (aa5)) (as calculated from the ratio between peaks of carbonyl groups in IR) was found to be 10%.

Next, a solution of a hydroxyl-group-containing-methacrylate-modified maleic anhydride-grafted polyolefin (A5) was obtained by carrying out modification with the hydroxyl-group-containing methacrylate in the same way as of Production Example 1 except that the maleic anhydride-grafted polyolefin (aa1) as used in Production Example 1 was replaced with the aforementioned maleic anhydride-grafted polyolefin (aa5). The solid component having been obtained by removing the solvent from the resultant solution was analyzed by DSC. As a result, the melting point of the hydroxyl-group-containing-methacrylate-modified maleic anhydride-grafted polyolefin (A5) was 150° C. In addition, the solid component concentration of the resultant solution was 66.1%.

PRODUCTION EXAMPLE 6

A low-molecular polyolefin (a6) was obtained by thermal degradation in the same way as of Production Example I except that the high-molecular polyolefin as used in Production Example 1 was replaced with a high-molecular polyolefin (copolymer of propylene, ethylene and 1-butene: "VESTOPLAST 708" produced by Degussa Japan CO., LTD.). As results of analyses of this low-molecular polyolefin (a6), the number-average molecular weight was found to be 4,500 by GPC, and the composition was found to comprise propylene 70 mol %, ethylene 5 mol % and 1-butene 25 mol % by pyrolysis gas chro.

Next, a maleic anhydride-grafted polyolefin (aa6) was obtained by carrying out grafting of maleic anhydride in the same way as of Production Example 1 except that the low-molecular polyolefin (a1) as used in Production Example 1 was replaced with the aforementioned low-molecular polyolefin (a6). As results of analyses of this maleic anhydride-grafted polyolefin (aa6), the number-average molecular weight was found to be 5,000 by GPC, and the melting point was found to be 80° C. by DSC, and the maleic anhydride addition ratio (ratio for which the maleic anhydride-derived structural units accounted in the maleic anhydride-grafted polyolefin (aa6)) (as calculated from the ratio between peaks of carbonyl groups in IR) was found to be 10%.

Next, a solution of a hydroxyl-group-containing-methacrylate-modified maleic anhydride-grafted polyolefin (A6) was obtained by carrying out modification with the hydroxyl-group-containing methacrylate in the same way as of Production Example 1 except that the maleic anhydride-grafted polyolefin (aa1) as used in Production Example 1 was replaced with the aforementioned maleic anhydride-grafted polyolefin (aa6). The solid component having been obtained by removing the solvent from the resultant solution was analyzed by DSC. As a result, the melting point of the hydroxyl-group-containing-methacrylate-modified maleic anhydride-grafted polyolefin (A6) was 80° C. In addition, the solid component concentration of the resultant solution was 66.1%.

PRODUCTION EXAMPLE 7

The low-molecular polyolefin (a1) was obtained in the same way as of Production Example 1. Next, a maleic anhydride-grafted polyolefin (aa7) was obtained by carrying out grafting of maleic anhydride in the same way as of Production Example 1 except that the amount of the maleic anhydride was changed to 15 parts relative to 160 parts of the low-molecular polyolefin (a1). As results of analyses of this maleic anhydride-grafted polyolefin (aa7), the number-average molecular weight was found to be 5,200 by GPC, and the melting point was found to be 102° C. by DSC, and the maleic anhydride addition ratio (ratio for which the maleic anhydride-derived structural units accounted in the maleic anhydride-grafted polyolefin (aa7)) (as calculated from the ratio between peaks of carbonyl groups in IR) was found to be 7%.

Next, a solution of a hydroxyl-group-containing-methacrylate-modified maleic anhydride-grafted polyolefin (A7) was obtained by carrying out modification with the hydroxyl-group-containing methacrylate in the same way as of Production Example 1 except that the maleic anhydride-grafted polyolefin (aa1) as used in Production Example 1 was replaced with the aforementioned maleic anhydride-grafted polyolefin (aa7). The solid component having been obtained by removing the solvent from the resultant solution was analyzed by DSC. As a result, the melting point of the hydroxyl-group-containing-methacrylate-modified maleic anhydride-grafted polyolefin (A7) was 102° C. In addition, the solid component concentration of the resultant solution was 66.1%.

PRODUCTION EXAMPLE 8

The low-molecular polyolefin (a1) was obtained in the same way as of Production Example 1. Next, a maleic anhydride-grafted polyolefin (aa8) was obtained by carrying out grafting of maleic anhydride in the same way as of Production Example 1 except that the amount of the maleic anhydride was changed to 28 parts relative to 160 parts of the low-molecular polyolefin (a1). As results of analyses of this maleic anhydride-grafted polyolefin (aa8), the number-average molecular weight was found to be 5,100 by GPC, and the melting point was found to be 98° C. by DSC, and the maleic anhydride addition ratio (ratio for which the maleic anhydride-derived structural units accounted in the maleic anhydride-grafted polyolefin (aa8)) (as calculated from the ratio between peaks of carbonyl groups in IR) was found to be 13%.

Next, a solution of a hydroxyl-group-containing-methacrylate-modified maleic anhydride-grafted polyolefin (A8) was obtained by carrying out modification with the hydroxyl-group-containing methacrylate in the same way as of Production Example 1 except that the maleic anhydride-grafted polyolefin (aa1) as used in Production Example 1 was replaced with the aforementioned maleic anhydride-grafted polyolefin (aa8). The solid component having been obtained by removing the solvent from the resultant solution was analyzed by DSC. As a result, the melting point of the hydroxyl-group-containing-methacrylate-modified maleic anhydride-grafted polyolefin (A8) was 98° C. In addition, the solid component concentration of the resultant solution was 66.1%.

PRODUCTION EXAMPLE 9

The low-molecular polyolefin (a1) was obtained in the same way as of Production Example 1. Next, a maleic anhydride-grafted polyolefin (aa9) was obtained by carrying out grafting of maleic anhydride in the same way as of Production Example 1 except that the amount of the maleic anhydride was changed to 7 parts relative to 160 parts of the low-molecular polyolefin (a1). As results of analyses of this maleic anhydride-grafted polyolefin (aa9), the number-average molecular weight was found to be 4,600 by GPC, and the melting point was found to be 105° C. by DSC, and the maleic anhydride addition ratio (ratio for which the maleic anhydride-derived structural units accounted in the maleic anhydride-grafted polyolefin (aa9)) (as calculated from the ratio between peaks of carbonyl groups in IR) was found to be 3%.

Next, a solution of a hydroxyl-group-containing-methacrylate-modified maleic anhydride-grafted polyolefin (A9) was obtained by carrying out modification with the hydroxyl-group-containing methacrylate in the same way as of Production Example 1 except that the maleic anhydride-grafted polyolefin (aa1) as used in Production Example 1 was replaced with the aforementioned maleic anhydride-grafted polyolefin (aa9). The solid component having been obtained by removing the solvent from the resultant solution was analyzed by DSC. As a result, the melting point of the hydroxyl-group-containing-methacrylate-modified maleic anhydride-grafted polyolefin (A9) was 105° C. In addition, the solid component concentration of the resultant solution was 66.1%.

PRODUCTION EXAMPLE 10

The low-molecular polyolefin (a1) was obtained in the same way as of Production Example 1. Next, a maleic anhydride-grafted polyolefin (aa10) was obtained by carrying out grafting of maleic anhydride in the same way as of Production Example 1 except that the amount of the maleic anhydride was changed to 45 parts relative to 160 parts of the low-molecular polyolefin (a1). As results of analyses of this maleic anhydride-grafted polyolefin (aa10), the number-average molecular weight was found to be 5,400 by GPC, and the melting point was found to be 95° C. by DSC, and the maleic anhydride addition ratio (ratio for which the maleic anhydride-derived structural units accounted in the maleic anhydride-grafted polyolefin (aa10)) (as calculated from the ratio between peaks of carbonyl groups in IR) was found to be 18%.

Next, a solution of a hydroxyl-group-containing-methacrylate-modified maleic anhydride-grafted polyolefin (A10) was obtained by carrying out modification with the hydroxyl-group-containing methacrylate in the same way as of Production Example 1 except that the maleic anhydride-grafted polyolefin (aa1) as used in Production Example 1 was replaced with the aforementioned maleic anhydride-grafted polyolefin (aa10). The solid component having been obtained by removing the solvent from the resultant solution was analyzed by DSC. As a result, the melting point of the hydroxyl-group-containing-methacrylate-modified maleic anhydride-grafted polyolefin (A10) was 95° C. In addition, the solid component concentration of the resultant solution was 66.1%.

Examples 1 to 10 and Comparative Examples 1 to 8

A container (as equipped with a stirrer, a thermometer, a condenser, and a decanter) was charged with any one of the solutions of the acryl-modified maleic anhydride-grafted polyolefins (A1) to (A10) (having been obtained from the above Production Examples), a urethane-acrylic oligomer (B1) ("Ebecryl EB-8402" produced by DAICEL UCB COMPANY LTD.), a polyfunctional acrylate (B2) ("KAYARAD DPCA-20" produced by Nippon Kayaku Co., Ltd.), and a difunctional acrylate (B3) ("LIGHT ACRYLATE 1,9-ND-A" produced by KYOEISHA CHEMICAL Co., LTD.) in that order in accordance with the formulation composition as shown in Tables 1 and 2 (wherein: the values in these tables are solid component amounts and, as to the solutions of the acryl-modified maleic anhydride-grafted polyolefins (A1) to (A10), actually the amounts as calculated from their solid component concentrations were charged). The resultant mixture was heated to 90° C. under stirring in a hot water bath while a large amount of air was caused to blow into the mixture. Subsequently, while 90° C. was maintained, a large amount of air was caused to blow into the mixture to thereby completely remove the solvent component from the inside of the reactor, and then the mixture was cooled to 40° C. Next, a radical polymerization initiator (C1) ("Trigonox 121-50" produced by Kayaku Akzo Co., Ltd.), an ultraviolet absorbing agent (1) ("Tinuvin 384" produced by Ciba-Geigy AG), an ultraviolet absorbing agent (2) ("Tinuvin 400" produced by Ciba-Geigy AG), a shining material ("MH-8801" produced by TOYO ALUMINUM K. K.), a color pigment paste (having been prepared by the below-mentioned process), and a defoamer ("BYK-028" produced by BYK Chemie GmbH) were added thereto in accordance with the formulation composition as shown in Tables 1 and 2 (wherein: the values in these tables are solid component amounts and, as to the color pigment paste, the amount of only the color pigment (carbon black) is shown), and then the resultant mixture was stirred until becoming uniform, and then cooled to room temperature. Thereafter, furthermore, the mixture was left at room temperature in a vacuum drier for 3 hours to thereby carry out defoaming and devolatilization, thus obtaining each paint composition.

Incidentally, the above color pigment paste was prepared in the following way. That is to say, a mixture (having been prepared by mixing 3 parts of carbon black ("MONARCH 1300" produced by CABOT CORPORATION), 3 parts of a pigment dispersant ("SOLPERSE 32000" produced by LUBRIZOL Co., LTD.), and 27 parts of the difunctional acrylate ("LIGHT ACRYLATE 1,9-ND-A" produced by KYOEISHA CHEMICAL Co., LTD.) together) and glass beads were mixed together in a ratio of the aforementioned mixture/glass beads=1/1 (mass ratio) to disperse the carbon black into particle diameters of not larger than 5 μm with a sand grinder mill, thus obtaining the color pigment paste of PWC 9%, wherein the aforementioned 27 parts of difunctional acrylate being used for the preparation of the color pigment paste was used from the necessary amount of the difunctional acrylate (B3) as shown in the formulation composition of Tables 1 and 2 and was adjusted so that the formulation composition of Tables 1 and 2 would be given in total with the amount of the difunctional acrylate being used for the preparation of the color pigment paste. Incidentally, in Example 8 and Comparative Example 6, only the necessary amount of the difunctional acrylate (B3) as shown in the formulation composition of Tables 1 and 2 was short of the aforementioned 27 parts necessary for the preparation of the color pigment paste. Therefore, in these cases, the deficiency by which the difunctional acrylate was short of the aforementioned 27 parts was supplied from the necessary amount of the urethane-acrylic oligomer (B1) as shown in the formulation composition of Tables 1 and 2, thus preparing the color pigment paste. If it was still short of the aforementioned 27 parts, then its deficiency was supplied from the necessary amount of the polyfunctional acrylate (B2) as shown in the formulation composition of Tables 1 and 2, thus preparing the color pigment paste.

The paint compositions having been obtained from the above Examples 1 to 10 and Comparative Examples 1 to 8 were variously evaluated below. Their results are shown in Table 3.

<Adhesion During High-Temperature Mold Releasing>:

A polypropylene ("Milastomer 7030B" produced by Mitsui Chemicals, INC.) was molded with a box-shaped mold (width 150 mm×length 210 mm×height 20 mm) (as adjusted

TABLE 1

| | | | Example 1 | 2 | 3 | 4 | 5 | 6 | 7 | 8 | 9 | 10 |
|---|---|---|---|---|---|---|---|---|---|---|---|---|
| Component A | Acryl-modified maleic anhydride-grafted polyolefin (wherein: other than A4 are hydroxyl-group-containing-methacrylate-modified, and A4 is HBA-MMA-BA-modified) | (A1) | 20 | — | — | — | — | — | 10 | 50 | 20 | 20 |
| | | (A2) | — | 20 | — | — | — | — | — | — | — | — |
| | | (A3) | — | — | 20 | — | — | — | — | — | — | — |
| | | (A4) | — | — | — | 20 | — | — | — | — | — | — |
| | | (A5) | — | — | — | — | — | — | — | — | — | — |
| | | (A6) | — | — | — | — | — | — | — | — | — | — |
| | | (A7) | — | — | — | — | 20 | — | — | — | — | — |
| | | (A8) | — | — | — | — | — | 20 | — | — | — | — |
| | | (A9) | — | — | — | — | — | — | — | — | — | — |
| | | (A10) | — | — | — | — | — | — | — | — | — | — |
| Component B | Urethane-acrylic oligomer | (B1) | 35 | 35 | 35 | 35 | 35 | 35 | 39 | 22 | 35 | 35 |
| | Polyfunctional acrylate | (B2) | 10 | 10 | 10 | 10 | 10 | 10 | 12 | 6 | 10 | 10 |
| | Difunctional acrylate | (B3) | 35 | 35 | 35 | 35 | 35 | 35 | 39 | 22 | 35 | 35 |
| Component C | Radical polymerization initiator | (C1) | 4 | 4 | 4 | 4 | 4 | 4 | 4 | 4 | 2 | 7 |
| Other Components | Defoamer | | 0.5 | 0.5 | 0.5 | 0.5 | 0.5 | 0.5 | 0.5 | 0.5 | 0.5 | 0.5 |
| | Ultraviolet absorbing agent (1) | | 2 | 2 | 2 | 2 | 2 | 2 | 2 | 2 | 2 | 2 |
| | Ultraviolet absorbing agent (2) | | 1 | 1 | 1 | 1 | 1 | 1 | 1 | 1 | 1 | 1 |
| | Shining material | | — | — | — | 2 | — | — | — | — | — | 2 |
| | Color pigment paste (pigment amount only) | | 3 | 3 | 3 | 3 | 3 | 3 | 3 | 3 | 3 | 3 |
| Melting point (° C.) of component A | | | 102 | 105 | 110 | 102 | 102 | 98 | 102 | 102 | 102 | 102 |
| Maleic anhydride addition ratio (%) in component A | | | 10 | 10 | 10 | 10 | 7 | 13 | 10 | 10 | 10 | 10 |
| Component A/component B (mass ratio) | | | 20/80 | 20/80 | 20/80 | 20/80 | 20/80 | 20/80 | 10/90 | 50/50 | 20/80 | 20/80 |
| Component C/(component A + component B) (mass ratio) | | | 4/100 | 4/100 | 4/100 | 4/100 | 4/100 | 4/100 | 4/100 | 4/100 | 2/100 | 7/100 |

TABLE 2

| | | | Comparative Example 1 | 2 | 3 | 4 | 5 | 6 | 7 | 8 |
|---|---|---|---|---|---|---|---|---|---|---|
| Component A | Acryl-modified maleic anhydride-grafted polyolefin (wherein: other than A4 are hydroxyl-group-containing-methacrylate-modified, and A4 is HBA-MMA-BA-modified) | (A1) | — | — | — | — | 3 | 70 | 20 | 20 |
| | | (A2) | — | — | — | — | — | — | — | — |
| | | (A3) | — | — | — | — | — | — | — | — |
| | | (A4) | — | — | — | — | — | — | — | — |
| | | (A5) | 20 | — | — | — | — | — | — | — |
| | | (A6) | — | 20 | — | — | — | — | — | — |
| | | (A7) | — | — | — | — | — | — | — | — |
| | | (A8) | — | — | — | — | — | — | — | — |
| | | (A9) | — | — | 20 | — | — | — | — | — |
| | | (A10) | — | — | — | 20 | — | — | — | — |
| Component B | Urethane-acrylic oligomer | (B1) | 35 | 35 | 35 | 35 | 42.5 | 13 | 35 | 35 |
| | Polyfunctional acrylate | (B2) | 10 | 10 | 10 | 10 | 12 | 4 | 10 | 10 |
| | Difunctional acrylate | (B3) | 35 | 35 | 35 | 35 | 42.5 | 13 | 35 | 35 |
| Component C | Radical polymerization initiator | (C1) | 4 | 4 | 4 | 4 | 4 | 4 | 0.05 | 15 |
| Other components | Defoamer | | 0.5 | 0.5 | 0.5 | 0.5 | 0.5 | 0.5 | 0.5 | 0.5 |
| | Ultraviolet absorbing agent (1) | | 2 | 2 | 2 | 2 | 2 | 2 | 2 | 2 |
| | Ultraviolet absorbing agent (2) | | 1 | 1 | 1 | 1 | 1 | 1 | 1 | 1 |
| | Shining material | | — | — | — | — | — | — | — | — |
| | Color pigment paste (pigment amount only) | | 3 | 3 | 3 | 3 | 3 | 3 | 3 | 3 |
| Melting point (° C.) of component A | | | 150 | 80 | 105 | 95 | 102 | 102 | 102 | 102 |
| Maleic anhydride addition ratio (%) in component A | | | 10 | 10 | 3 | 18 | 10 | 10 | 10 | 10 |
| Component A/component B (mass ratio) | | | 20/80 | 20/80 | 20/80 | 20/80 | 3/97 | 70/30 | 20/80 | 20/80 |
| Component C/(component A + component B) (mass ratio) | | | 4/100 | 4/100 | 4/100 | 4/100 | 4/100 | 4/100 | 0.05/100 | 15/100 | to a mold temperature of 80° C.) by an injection molding machine ("ES-3000" produced by NISSEI PLASTIC INDUSTRIAL CO., LTD.), and then only the cavity mold was exchanged for a cavity mold (as adjusted to 120° C.) wherein a cavity of 0.1 mm was secured between the cavity mold and the resultant molding. Then, the paint composition was injected into this cavity of 0.1 mm with a liquid-paint injector (produced by NIHON POWERED KOGYO CO., LTD.) in about 1 second and then retained for 30 seconds. Thereafter, the mold was opened to take out the resultant molding as a test piece.

Immediately after the peeled-off state of the formed paint film of the resultant test piece had been checked, cross-cuts in the shape of checkerboard squares of 2 mm each in width were made into the test piece with a cutter knife. Then, a peeling-off test of strongly pressing a Sellotape (Scotch tape) (registered trade mark) (produced by NICHIBAN) on the cut checkerboard squares and then vigorously peeling off the tape was carried out three times over. Every time this test was carried out, whether any peeling-off of the paint film occurred or not was checked, and its result was judged, along with the peeled-off state of the paint film having been checked before the cross-cutting, on the following standards:

○: Peeling-off of the paint film is seen neither before the cross-cutting nor in any of the three times of peeling-off tests.

×: Peeling-off of the paint film is seen before the cross-cutting or in any of the three times of peeling-off tests.

<Adhesion>:

A polypropylene ("Milastomer 7030B" produced by Mitsui Chemicals, INC.) was molded with a box-shaped mold (width 150 mm×length 210 mm×height 20 mm) (as adjusted to a mold temperature of 80° C.) by an injection molding machine ("ES-3000" produced by NISSEI PLASTIC INDUSTRIAL CO., LTD.), and then only the cavity mold was exchanged for a cavity mold (as adjusted to 120° C.) wherein a cavity of 0.1 mm was secured between the cavity mold and the resultant molding. Then, the paint composition was injected into this cavity of 0.1 mm with a liquid-paint injector (produced by NIHON POWERED KOGYO CO., LTD.) in about 1 second and then retained for 30 seconds. Immediately thereafter, cooling down to 40° C. was carried out with cooling water. Thereafter, the mold was opened to take out the resultant molding as a test piece.

The resultant test piece was left at room temperature to remove the heat, and then cross-cuts in the shape of checkerboard squares of 2 mm each in width were made into the test piece with a cutter knife. Then, a peeling-off test of strongly pressing a Sellotape (Scotch tape) (registered trade mark) (produced by NICHIBAN) on the cut checkerboard squares and then vigorously peeling off the tape was carried out three times over. Every time this test was carried out, whether any peeling-off of the paint film occurred or not was checked, and its result was judged on the following standards:

○: Peeling-off of the paint film is not seen in any of the three times of peeling-off tests.

×: Peeling-off of the paint film is seen in any of the three times of peeling-off tests.

<Water-Resistant Secondary Adhesion>:

A test piece was obtained in the same way as of the aforementioned adhesion evaluation.

The resultant test piece was immersed in warm water of 40° C. for 10 days and then left at room temperature to remove the heat. Thereafter, cross-cuts in the shape of checkerboard squares of 2 mm each in width were made into the test piece with a cutter knife. Then, a peeling-off test of strongly pressing a Sellotape (Scotch tape) (registered trade mark) (produced by NICHIBAN) on the cut checkerboard squares and then vigorously peeling off the tape was carried out three times over. Every time this test was carried out, whether any peeling-off of the paint film occurred or not was checked, and its result was judged on the following standards:

○: Peeling-off of the paint film is not seen in any of the three times of peeling-off tests.

×: Peeling-off of the paint film is seen in any of the three times of peeling-off tests.

<Turbidity of Paint Film>:

A composition was separately prepared by excluding the shining material and the color pigment (carbon black) from the paint composition. Then, into a box-shaped mold (width 100 mm×length 200 mm×height 0.1 mm), there was put 3 g of this prepared composition, and further thereon a flat mold was put to shape the composition into a film. This film, along with the mold, was sandwiched in with a heat press as set at 120° C., thereby heating the mold temperature to 120° C. Thereafter, the mold was opened to take out the film as a test piece. Then, the haze value of the resultant test piece (film) was measured with a turbidimeter (produced by Nippon Denshoku Kogyo Co., Ltd.) and then judged on the following standards:

○: The haze value was not more than 5.

Δ: The haze value was more than 5, but not more than 15.

×: The haze value was more than 15.

<Flowability>:

A tank (diameter 100 mm×height 200 mm) was charged with the paint composition and then covered with a lid, and then an air pressure of 4 kg/cm$^2$ was applied from a hose connecting with the lid. Next, in this state where the air pressure was applied, the cock at the bottom of the tank was opened to make the paint composition flow out of the front end of a hose (diameter 10 mm×length 1 mm) connecting with the cock, when its state was observed with the eye and judged on the following standards:

○: The paint composition uniformly flows out of the front end of the hose.

×: The paint composition does not flow out at all or does non-uniformly flows out.

TABLE 3

| | Example | | | | | | | | | | Comparative Example | | | | | | | |
|---|---|---|---|---|---|---|---|---|---|---|---|---|---|---|---|---|---|---|
| | 1 | 2 | 3 | 4 | 5 | 6 | 7 | 8 | 9 | 10 | 1 | 2 | 3 | 4 | 5 | 6 | 7 | 8 |
| Adhesion during high-temperature mold releasing | ○ | ○ | ○ | ○ | ○ | ○ | ○ | ○ | ○ | ○ | ○ | × | ○ | ○ | × | ○ | × | × |
| Adhesion | ○ | ○ | ○ | ○ | ○ | ○ | ○ | ○ | ○ | ○ | ○ | ○ | ○ | ○ | ○ | × | ○ | × | × |

TABLE 3-continued

|  | Example | | | | | | | | | | Comparative Example | | | | | | | |
| --- | --- | --- | --- | --- | --- | --- | --- | --- | --- | --- | --- | --- | --- | --- | --- | --- | --- | --- |
|  | 1 | 2 | 3 | 4 | 5 | 6 | 7 | 8 | 9 | 10 | 1 | 2 | 3 | 4 | 5 | 6 | 7 | 8 |
| Water-resistant secondary adhesion | ○ | ○ | ○ | ○ | ○ | ○ | ○ | ○ | ○ | ○ | X | ○ | X | X | X | ○ | X | X |
| Turbidity of paint film | ○ | ○ | ○ | ○ | ○ | ○ | ○ | ○ | ○ | ○ | Δ | ○ | X | ○ | ○ | X | ○ | ○ |
| Flowability | ○ | ○ | ○ | ○ | ○ | ○ | ○ | ○ | ○ | ○ | ○ | ○ | ○ | ○ | ○ | ○ | X | ○ |

INDUSTRIAL APPLICATION

The paint composition according to the present invention can be used favorably as a coating agent for in-mold coating of all thermoplastic plastic substrates regardless of polar or nonpolar ones, such as polyolefin substrates, ABS substrates, polycarbonate substrates, urethane substrates, polyester substrates, polystyrene substrates, vinyl chloride substrates, and polyamide substrates. In addition, the thermoplastic plastic molding according to the present invention can be used favorably as various industrial materials for such as home electric appliances and automobile parts.

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. A paint composition for in-mold coating of thermoplastic plastic substrates, which is a paint composition comprising: an acryl-modified unsaturated dicarboxylic acid anhydride-grafted polyolefin (A); at least one member (B) selected from the group consisting of reactive oligomers and reactive monomers; and a radical polymerization initiator (C); in the following formulation ratio:

(A)/(B)=6.5/93.5 to 60/40 (mass ratio)

(C)/[(A)+(B)]=0.1/100 to 10/100 (mass ratio)

wherein: the acryl-modified unsaturated dicarboxylic acid anhydride-grafted polyolefin (A) is in the range of 95 to 112° C. in melting point and in the range of 5 to 15 mass % in ratio for which unsaturated dicarboxylic acid anhydride-derived structural units account in its structure; and wherein: a polyolefin component which constitutes the acryl-modified unsaturated dicarboxylic acid anhydride-grafted polyolefin (A) is a thermally degraded polyolefin from a high-molecular polyolefin, and wherein the high-molecular polyolefin has a number-average molecular weight of 15,000 to 150,000.

2. A thermoplastic plastic molding, which is coated with the paint composition as recited in claim 1 for in-mold coating.

* * * * *